Feb. 19, 1963  A. ARUTUNOFF  3,077,936
DIAMOND DRILL
Filed Nov. 6, 1961  2 Sheets-Sheet 1
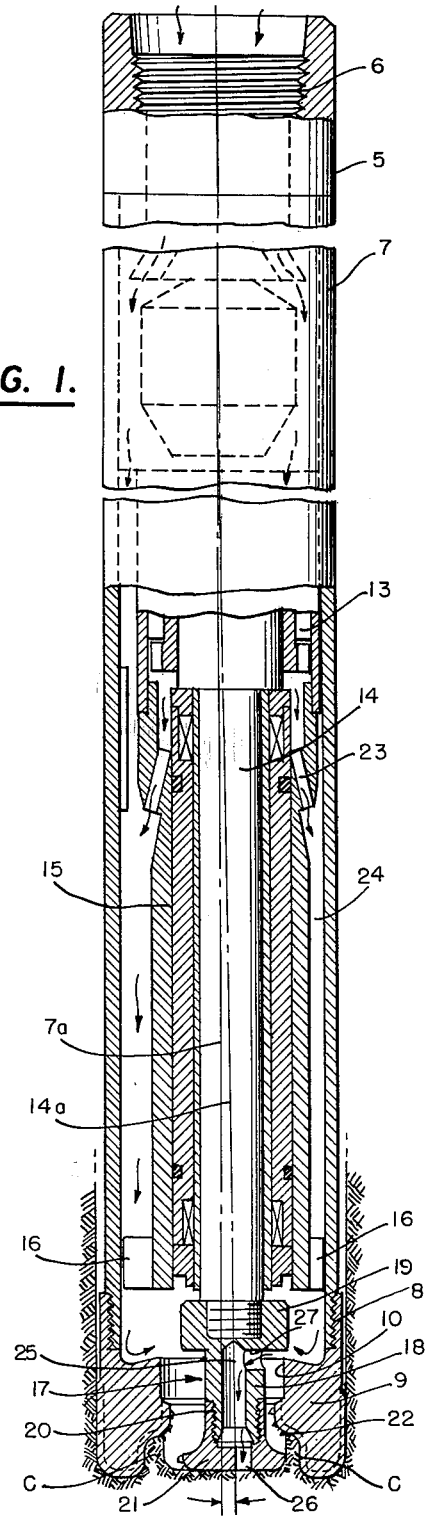
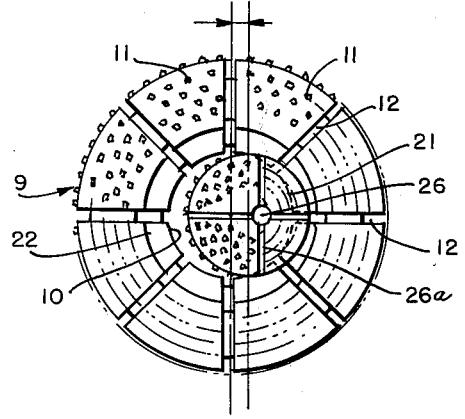
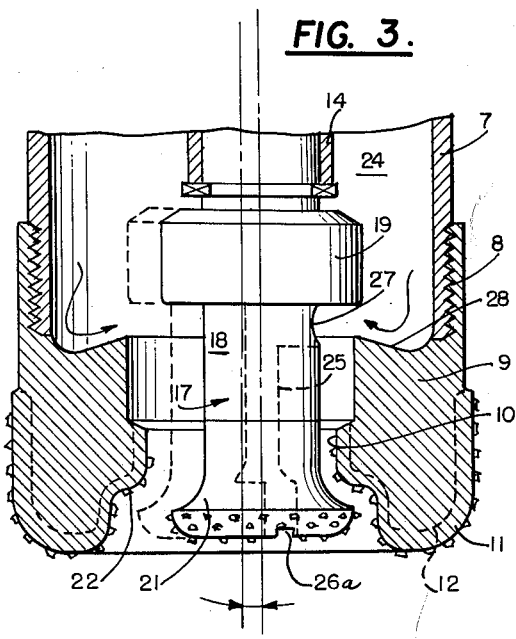
INVENTOR
Armais Arutunoff
BY
ATTORNEY Feb. 19, 1963  A. ARUTUNOFF  3,077,936
DIAMOND DRILL
Filed Nov. 6, 1961  2 Sheets-Sheet 2

INVENTOR.
Armais Arutunoff
BY
ATTORNEY

United States Patent Office 3,077,936
Patented Feb. 19, 1963

3,077,936
DIAMOND DRILL
Armais Arutunoff, 1200 Cherokee, Bartlesville, Okla.
Filed Nov. 6, 1961, Ser. No. 150,294
4 Claims. (Cl. 175—101)

This invention relates to rotary rock drilling bits and consists more particularly in new and useful improvements in a diamond drill of the type basically described in my prior Patent No. 2,709,574, issued May 31, 1955.

Diamond bits of the type ordinarily used in connection with hard rock drilling operations by the rotary method are limited in their penetrating speed by the lack of cutting speed at the central portion of the bit. As explained in my prior patent, the lack of cutting speed at the center of the rotary bit materially retards the operation because the rock in the center portion is not actually cut, but must be crushed by the weight of the bit before progress is possible. As in my said former patent, the basic object of the present invention is to provide a rotary bit having a main cutting head of the type which provides a central core receiving recess at its cutting end, and is provided with a supplemental core-removing bit so arranged with respect to the core receiving recess as to disintegrate the core as the main cutting head progresses.

In many instances, drills of this nature encounter unconsolidated formations which tend to break up into chunks or layers and interfere with the operation of the drill. As will be seen from my said former patent, the main cutting head is provided with a central core receiving recess which becomes completely filled with an upstanding core and the supplemental core-removing high speed bit located immediately above the core receiving recess. As the main cutting head progresses, the supplemental bit disintegrates the upstanding core, but, as before pointed out, if unconsolidated formations are encountered, the supplemental bit has a tendency to break the core into chunks or layers which are objectionable and interfere with the satisfactory operation of the drill.

The present invention is designed to meet the requirements of formations of variable solidity and stratification, and while basically similar to my said former invention, and possessing all of the advantages thereof, the configuration of the main cutting head and the location of the supplemental bit is such that the drilling is accomplished while reducing to a minimum, the tendency of the core to break into chunks. In other words, with the present invention, the main cutting head which supports the weight of the entire drilling assembly, initiates the drilling operation and the supplemental bit, located preferably within the confines of the annular main cutting head, grinds the core or center of the core.

Aside from the relative location, operation and configuration of the main and supplemental cutting heads and the principle of preserving the strength of the formation until subsequently disintegrated, the present invention is essentially the same as that disclosed in my said former patent, in that it provides a self-contained drilling tool wherein the supplemental core removing bit is driven by a fluid-operated motor, housed in the main body structure, and actuated by the circulating drilling fluid, the supplemental bit being driven by a fluid-operated motor consisting of an axial-type turbine and being mounted on an eccentric axis which is also preferably inclined or is eccentric with respect to the axis of rotation of the main drilling head.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a view partly in longitudinal section and partly in elevation, showing my improved bit assembly;

FIG. 2 is a bottom end elevation of the assembly on a slightly enlarged scale;

FIG. 3 is an enlarged vertical sectional view of the cutting end of the assembly;

Figure 4:
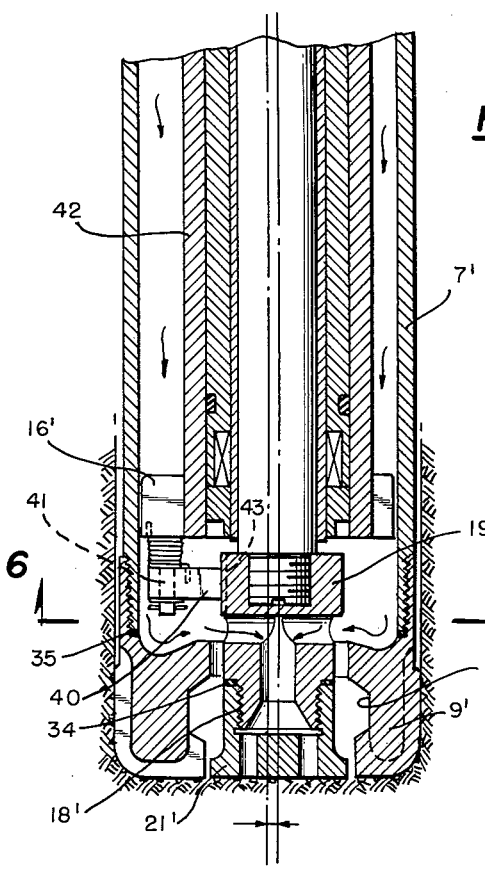
FIG. 4 is a longitudinal sectional view of a modified form of the invention.

In the drawings, 5 represents the base portion of a hollow cylindrical shank or coupling member, internally threaded as at 6, to facilitate connection to the usual hollow drill stem (not shown). The base portion 5 is connected by conventional means to the upper end of a cylindrical body 7 which serves both as a housing for the fluid-operated motor hereinafter referred to, and as a supporting member for the main cutting head.

The lower end of the housing or body 7 is threaded as at 8 to engage complementary threads in the upstanding connecting flange of the main cutting head 9, the cutting portion of which is preferably diamond-studded and extends radially beyond the periphery of the cylindrical body 7, as best seen in FIG. 3. The central portion of the main cutting head 9 is recessed as at 10, to form an annular cutting area which is preferably divided into a series of segmental cutting units 11, by an intervening series of channels 12 which communicate with the central recess 10. As seen in the drawings, each of these channels extends entirely around the cutting surface of the head 9, so as to establish fluid communication from the central recess 10 to the periphery of the head.

The cylindrical body 7 houses a fluid-operated motor 13, the shaft 14 of which, while extending generally longitudinally within the body 7, is arranged on a longitudinal axis which is preferably, but not necessarily, inclined with respect to the longitudinal axis of the body 7, as will be seen from FIG. 1, where 7a represents the axis of the body 7, and 14a, the inclined axis of the shaft 14.

Regardless of the inclination of the axis of the shaft 14, the motor and shaft are mounted within the cylindrical body 7 in eccentric relation with respect to the annular recess 10, the shaft 14 being rotatably supported in a sleeve and bearing assembly 15, provided with radial spacers 16, designed to maintain the eccentric relationship of the lower end of the shaft 14.

This shaft carries at its lower end a supplemental drilling unit generally indicated by the numeral 17, and comprising a stem 18 which is radially enlarged at its upper end to form a combination connecting member and baffle 19, hereinafter referred to more in detail. The lower extremity of the stem 18 is threaded as at 20 to engage the complementary internal threads of a supplement cutting head 21 which is located within the vertical and radial confines of the opening 10 in the main cutting head 9.

As seen in the drawings, the internal contour of the main cutting head 9, forming the central opening 10, is designed to provide an inwardly directed annular shoulder 22 which partially overhangs the flaring end of the supplemental cutting head 21, said supplemental cutting head being spaced laterally and downwardly from the adjacent surfaces defining the opening and spaced slightly upwardly from the horizontal plane of the lower cutting surface of the main cutting head 9. Thus, as the annular main cutting head 9 progresses, together with the inwardly spaced supplemental cutting head 21, an annular upstanding rim-like short core C is formed in the recess 10, the upper surface of said rim-like core being progressively ground down by the shoulder 22. At the same time, the central portion of what would otherwise be a massive core, is ground down in advance of engagement of the rim by the shoulder 22. It will be seen that the arrangement of the present invention forms a strong core having a very short ring-shaped or annular top surface which is subsequently ground by the main core head in a manner which prevents crumbling as the high speed supplemental bit progresses.

The fluid discharged from the turbine or motor 13 is directed downwardly through discharge passageways 23 and the cylindrical chamber 24 surrounding the shaft supporting sleeve 15 and serves to facilitate the drilling operation in the usual manner. In this connection, it will be noted that the supplemental drilling unit 17 is provided with a central vertical fluid passageway 25, the lower end of which terminates in communication with an eccentrically located discharge port 26 in the supplemental head 21, its upper end being in communication with a radial port 27 which opens into the central recess 10 in the main cutting head.

As best seen in FIG. 3, the upper inner face of the main cutting head 9 is provided with an annular fluid deflecting cavity 28 which in effect defines the lower limit of chamber 24. This cavity intercepts the fluid flowing downwardly in chamber 24 and directs it inwardly toward the supplemental drilling unit 17 and into the central recess 10, a portion of said fluid being directed into the radial port 27 by the overhanging baffle member 19 and thence downwardly through passageway 25 and discharge port 26. Thus, a continuous flow of fluid travels through the central opening 10, around the supplemental cutting head and through the fluid channels 12 as the drilling assembly progresses.

It is also desirable to provide a series of radiating fluid channels 26a in the bottom cutting surface of the supplemental cutting head 21 which are in communication with the discharge port 26 to further facilitate the distribution of fluid.

The size of the central opening of the annular main cutting head and the corresponding diameter of the supplemental bit determine the size of the annular core to be formed and disposed of, and obviously can be varied within workable limits.

It is also to be noted that while the preferred form of the invention comprises a supplemental drilling bit which is mounted on an inclined axis as above described, the invention also contemplates an eccentrically mounted supplemental bit which rotates about a parallel but offset axis. It will thus be seen that I have provided an improved drilling assembly designed to progressively disintegrate the core without possible crumbling of the center or breaking it up into chunks or layers which may occur due to the lack of tensile strength or solidity of the formation being worked on by the high speed eccentric bit.

Figure 6:
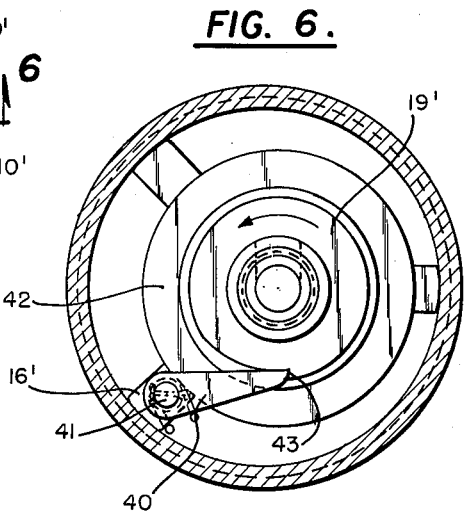
FIG. 6 is an enlarged transverse sectional view taken on line 6—6 of FIG. 4.
Figure 5:
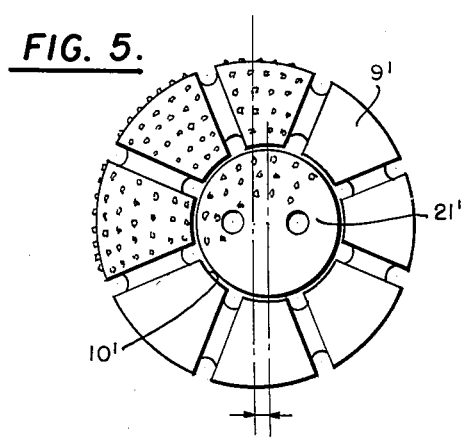
FIG. 5 is a bottom end elevation of the structure shown in FIG. 4.

In the form of the invention shown in FIGS. 4-6, the supplemental cutting head 21', while mounted eccentrically with respect to the main cutting head 9', is concentrically disposed with respect to the central recess 10' in the main cutting head. In this instance, the recess 10' itself is eccentrically located in the main cutting head. Also, as previously indicated, the axis of the supplemental cutting head, instead of being inclined with respect to the axis of the main housing, may be parallel thereto and it is thus shown in these figures of the drawings.

As will be seen in FIGURE 4, shims 34 and 35 are provided at the points of connection of the supplemental cutting head 21' to its stem 18' and the main cutting head 9', to the housing or body 7'. While shims are not necessary in the embodiment of the invention shown in FIGS. 1-3, they are desirable in the present form of the invention to assure proper alignment and relationship of the supplemental cutting head and the main cutting head. This proper relationship is provided by adding or reducing shims to stop the main cuttings head 9' as it is screwed on the body or housing, at the correct position with respect to the supplemental cutting head 21'.

In this modified form of drill, the essential features of the invention are substantially the same as those previously described. However, in this instance, the relationship of the supplemental cutting head 21' and the main cutting head 9' remains fixed at all times. As the main cutting head 9' rotates, it carries with it in a rotary path, the eccentrically mounted supplemental cutting head 21', the main cutting head rotating about an axis concentric with that of the housing 7', and the supplemental cutting head, about an eccentric axis.

As shown in FIG. 6, an auxiliary drive mechanism is preferably provided to effect rotation of the supplemental cutting head through mechanical connection with the main cutting head assembly, in the event the pressure of the operating fluid fails to drive the turbine and supplemental cutting head at a speed in excess of the rotation of the main cutting head. This mechanical connection is essentially the same as that disclosed in my prior Patent No. 2,709,574 issued May 31, 1955.

Briefly, the auxiliary drive mechanism comprises a spring loaded pawl 40 pivotally connected as at 41 to one of the radial spacers 16' which is fixed to the bearing sleeve 42 arranged to rotate with the housing 7'. The periphery of the baffle or collar 19' formed on the supplemental cutting head stem 18' is provided with a notch 43, arranged for engagement with the free end of the pawl 40. Thus, the rotation of the supplemental cutting head 21' in excess of the speed of the main cutting head 9' causes the notch 43 to pass idly by the spring loaded pawl 40. However, upon a decrease in the speed of rotation of the supplemental cutting head, the rotation of the main cutting head 9' overtakes the supplemental cutting head and the pawl 40 engages the notch 43, causing the supplemental cutting head to rotate with the main cutting head.

From the foregoing, it is believed that my invention may be readily understood by those skilled in the art without further description, it being borne in mind that numerous changes may be made in the details disclosed without departing from the spirit of the invention as set forth in the following claims.

I claim:

1. In combination, an annular main bit and a separately driven supplemental bit located within the confines of said main bit, the annular cutting surface of said main bit adjacent said supplemental bit being inwardly step-shaped to at least partially overlie said supplemental bit, whereby said main bit first forms a core in the upper surface of which a cup-shaped depression is formed by said supplemental bit to provide an annular rim, which is disintegrated by the step-shaped surface of said main bit.

2. A drilling assembly adapted to be rotated by a pipe drill, comprising a driving member, a housing forming an extension of said driving member, an annular cutting head carried by and coaxial with said housing and having a central core receiving recess opening into said housing, an axial-type, fluid operated turbine in said housing, having an axis which is inclined and intersects the longitudinal axis of said housing, a shaft concentric with and operated by said inclined turbine, a supplemental bit coaxially connected to said inclined turbine shaft and located within the vertical and radial confines of the central core receiving recess of said annular cutting head, said supplemental bit having a radially enlarged cutting head eccentrically located within said central recess, and an annular cutting shoulder on said cutting head directed inwardly in said recess and at all times partially overlying said radially enlarged cutting head.

3. A drilling assembly as claimed in claim 2, including fluid circulating means.

4. A drilling assembly comprising a connecting shank, a cylindrical body secured to said shank and depending therefrom, a main cutting head carried at the lower end of said body and having a central core receiving recess at its cutting end, forming an annular cutting portion, a cylindrical chamber in said body, terminating at its lower end in a fluid directing cavity in liquid communication with said chamber and extending radially beyond the core receiving recess, a supplemental drilling unit housed in said chamber and including a fluid actuated turbine and turbine shaft, the axis of said supplemental drilling unit being inclined and intersecting the axis of rotation of said main cutting head, a supplemental cutting head fixed concentrically on said shaft and located within the confines of said central core receiving recess in eccentric relation thereto, means for admitting fluid under pressure to said turbine, communicating radial and vertical fluid conducting ports in said supplemental drilling unit, baffle means on said last-named unit located above and in proximity to said radial port, and an annular fluid deflecting surface in said cavity defining the upper extremity of said main cutting head, adjacent to and directed toward said baffle means, whereby fluid is discharged through said supplemental cutting head and around the adjacent cutting surface thereof.

References Cited in the file of this patent

UNITED STATES PATENTS

| | | |
|---|---|---|
| 1,836,638 | Wright et al. | Dec. 15, 1931 |
| 2,022,101 | Wright | Nov. 26, 1935 |
| 2,256,092 | Koebel et al. | Sept. 16, 1941 |
| 2,619,325 | Arutunoff | Nov. 25, 1952 |
| 2,626,780 | Ortloff | Jan. 27, 1953 |
| 2,709,574 | Arutunoff | May 31, 1955 |
| 2,877,988 | Cameron et al. | Mar. 17, 1959 |

FOREIGN PATENTS

| | | |
|---|---|---|
| 841,892 | Germany | June 19, 1952 |
| 1,230,512 | France | Apr. 14, 1960 |